(12) United States Patent
Ohtaka et al.

(10) Patent No.: US 7,424,179 B2
(45) Date of Patent: Sep. 9, 2008

(54) COLLISION DETECTING APPARATUS FOR VEHICLE

(75) Inventors: Koji Ohtaka, Anjo (JP); Shigenori Kobayashi, Hazu-gun (JP); Motomi Iyoda, Seto (JP); Yukio Nakagawa, Toyota (JP); Yasuyuki Hishida, Hitachi (JP); Takahiro Saito, Hitachi (JP)

(73) Assignees: DENSO CORPORATION, Kariya (JP); Toyota Jidosha Kabushiki Kaisha, Toyota (JP); Hitachi Cable Ltd., Tokyo (JP)

( * ) Notice: Subject to any disclaimer, the term of this patent is extended or adjusted under 35 U.S.C. 154(b) by 0 days.

(21) Appl. No.: 11/883,294

(22) PCT Filed: Mar. 27, 2006

(86) PCT No.: PCT/JP2006/306995

§ 371 (c)(1),
(2), (4) Date: Jul. 30, 2007

(87) PCT Pub. No.: WO2006/107007

PCT Pub. Date: Oct. 12, 2006

(65) Prior Publication Data

US 2008/0193075 A1  Aug. 14, 2008

(30) Foreign Application Priority Data

Apr. 4, 2005  (JP) ............................... 2005-107954

(51) Int. Cl.
*G02B 6/00* (2006.01)

(52) U.S. Cl. .......................... 385/13; 180/274; 340/436

(58) Field of Classification Search ..................... 385/13
See application file for complete search history.

(56) References Cited

U.S. PATENT DOCUMENTS

2002/0162952 A1  11/2002  Stuetzler et al.
2006/0008197 A1*  1/2006  Hohne et al. ................... 385/13
2007/0045026 A1*  3/2007  Theisen ...................... 180/274

FOREIGN PATENT DOCUMENTS

| DE | 103 33 732 B3 | 12/2004 |
| EP | 1 426 252 A1 | 6/2004 |
| JP | 05-116592 A | 5/1993 |
| JP | 07-190732 A | 7/1995 |
| WO | WO-00/50261 A2 | 8/2000 |

OTHER PUBLICATIONS

Communication dated Feb. 26, 2008 in European Application No. 06 730 943.5.

* cited by examiner

*Primary Examiner*—Sarah Song
(74) *Attorney, Agent, or Firm*—Harness, Dickey & Pierce, PLC

(57) ABSTRACT

An optical fiber sensor can be interposed between a bumper reinforcement and a load transmitting plate to extend in the direction of width of a vehicle along with the bumper reinforcement. In this case, when a change does not occur substantially in an immediately previous predetermined period in an output voltage of a light emission amount of the optical fiber sensor, a feedback control is performed in such a way that the change becomes a level of zero of the output voltage of the optical fiber sensor. In contrast, when a change in the output voltage is not substantially zero, the immediately previous state of emission of light is maintained. Accordingly, it is possible to effectively compensate a zero point shift caused by a temperature change or/and an aging degradation of the optical fiber sensor.

6 Claims, 5 Drawing Sheets

COLLISION DETECTING APPARATUS FOR VEHICLE

CROSS-REFERENCE TO RELATED APPLICATIONS

This application is a U.S. National Stage Application of International Application No. PCT/JP2006/306995, filed Mar. 27, 2006 and published in Japanese as WO 2006/107001 A1 on Oct. 12, 2006. This application claims the benefit of JP Application No. 2005-107954, filed Apr. 4, 2005. The disclosures of the above applications are incorporated herein by reference.

TECHNICAL FIELD

The present invention relates to a collision detecting apparatus for a vehicle and, in particular, to an apparatus that can accurately detect a collision of a pedestrian with a bumper of the vehicle.

BACKGROUND ART

JP-5-116592A and JP-7-190732A propose an optical-fiber type collision detecting apparatus for a vehicle, that extends an optical fiber throughout, for example, the front surface of the vehicle and uses a light-leaking optical fiber sensor for detecting a decrease in the amount of transmission of light of the optical fiber caused by the collision load of the vehicle. Moreover, the patent document 1 discloses: that the optical-fiber type collision detecting apparatus for a vehicle includes a cylindrical collision load transmitting member having a protrusion, in which an optical fiber sensor is built, so as to concentrate collision load from the outside on a predetermined local portion of the optical fiber to increase the amount of local bending of the optical fiber; and that the optical fiber is covered with an elastic body such as rubber.

When the above-described conventional optical-fiber type collision detecting apparatus for a vehicle is interposed between the bumper reinforcement and the front bumper of the vehicle, there is advantageous to the high-speed detection of a collision of a pedestrian with the respective portions of the front bumper. The optical fiber sensor has at least an optical fiber part that has an optical fiber deformed by a collision load and changes the amount of transmission of light according to the collision load, and a light sending/receiving circuit for sending and receiving light to and from this optical fiber.

To enhance the detection sensitivity of the collision load of this optical fiber sensor, it is necessary for the optical fiber part of the optical fiber sensor to be effectively deformed within the range of its allowable rate of deformation by the collision load inputted to the optical fiber sensor. To realize this, it is preferable to prevent the entire optical fiber part from being moved backward by the collision load applied thereto from the front, by mechanically supporting the optical fiber part, at the front of a bumper reinforcement, using the bumper reinforcement.

Moreover, considering that the front bumper has a considerable width in the direction of height and is easily deformed, it is preferable that a load transmitting plate for concentrating the collision load applied to the front bumper on the optical fiber sensor is interposed between the front bumper and the optical fiber sensor, and using it to collect the collision load inputted to the front bumper and then to deform the optical fiber part while transmitting the collision load to the bumper reinforcement. With this, the collision load inputted to the front bumper can be applied to the optical fiber part.

Moreover, the optical fiber of the optical fiber sensor is usually covered with an elastic body so as to mechanically protect the optical fiber and to provide the optical fiber with a property of recovery in deformation to a change in the collision load. In addition, the optical fiber sensor is usually provided with a stress concentrating plate so as to locally concentrate the collision load inputted thereto from the load transmitting plate on a predetermined portion in the left and right directions of the optical fiber.

However, in the above-described conventional optical-fiber type collision detecting apparatus for a vehicle, the characteristics, in particular, optical characteristics or mechanical characteristics of the optical fiber part of the optical fiber sensor are changed by a change in temperature or aging degradation. As a result, it is found that the above-described conventional optical-fiber type collision detecting apparatus for a vehicle has a problem that it cannot detect the collision load with high accuracy because the output signal of the optical fiber sensor is fluctuated by a change in these characteristics.

An affect of a temperature change exerted on an optical fiber sensor of a conventional structure in which an optical fiber covered with a rubber tube and a stress concentrating plate adjacent to this are buried in soft resin will be considered below.

It is here assumed that an optical fiber is a resin-based optical fiber made of methacrylic resin. First, the shape, for example, radius and the density of the optical fiber is changed by a temperature change. The modulus of elasticity of the rubber tube and the soft resin for covering the optical fiber is also changed. In addition, although detailed description will be omitted, the light emission amount of the light emitting circuit of the optical fiber sensor and the light receiving sensitivity of the light receiving circuit thereof are also changed by the effect of the temperature change exerted on an electronic circuit. The total sum of these affects produces fluctuations to be considered before and after the temperature change in the output signal of the optical fiber sensor with respect to equal collision loads inputted to the optical fiber.

Next, similarly, the affect of aging degradation will be considered below. First, the affect of the aging degradation is significant, in particular, in the modulus of elasticity of the rubber tube and the soft resin for covering the optical fiber, and the sensitivity of the optical fiber (the amount of change in output signal per unit collision load) is fluctuated by its change. In addition, the light emission amount of the light emitting circuit of the optical fiber sensor is decreased by the aging degradation, whereby the sensitivity of the optical fiber sensor is changed. The total sum of these affects produces fluctuations to be considered before and after the aging degradation in the output signal of the optical fiber sensor with respect to equal collision loads inputted to the optical fiber.

Describing a change in the characteristics of the optical fiber sensor caused by the above-described temperature change and aging degradation, the value of output signal is changed in the respective values of collision loads inputted to the optical fiber sensor by the temperature change and the aging degradation of the optical fiber sensor, but this change can be simply classified into fluctuation in zero point that is the value of the output signal when the collision load is not inputted and fluctuation in sensitivity that is the amount of change in the output signal per unit collision load.

In a general optical fiber sensor, a signal voltage nearly proportional to the amount of light received by the light receiving circuit is compared with a predetermined threshold voltage to determine the kind of a colliding body and hence the above-described fluctuation zero point means fluctuation in a threshold voltage. As a result, it is found that the kind of a colliding body cannot be determined with high accuracy to thereby raise the possibility of presenting the problem of causing errors in determination.

DISCLOSURE OF THE INVENTION

The present invention has been made in view of the above-described problems. The object of the present invention is to provide an optical-fiber type collision detecting apparatus for a vehicle, which can determine a collision with high accuracy regardless of the fluctuation in zero point of the output signal of an optical fiber, which is caused by temperature change or/and aging degradation.

According to a first aspect of the present invention, a collision detecting apparatus includes: an optical fiber sensor including an optical fiber, which is interposed between a bumper reinforcement and a front bumper of the vehicle and extends in a left-right direction, and a light sending/receiving circuit for introducing light into the optical fiber and for detecting light from the optical fiber; and a collision detecting circuit for extracting information relating to a collision load on the basis of a change in an output signal of the optical fiber sensor, that is caused by deformation of the optical fiber at a time of collision. In addition, the collision detecting apparatus includes: a detection means for detecting an amount of state that is correlated with fluctuations in a previously stored zero point offset amount of output of the optical fiber sensor and is capable of being converted to a state of an electric signal; a storage means for storing relating data showing a relation between the amount of state and the zero point offset amount; and an offset compensating means for compensating fluctuations in the zero point offset amount on the basis of the amount of state detected by the detection means and the relating data stored by the storage means.

The amount of state referred to here is correlated with fluctuations in the zero point offset amount and can be converted to a state of an electric signal. For example, the amount of state is an operating time of the optical fiber sensor, a temperature and a humidity of the optical fiber sensor, the histories of them, and a combination of them. The operating time causes the aging degradation of the optical fiber sensor and the magnitude of the zero point offset amount has a positive correlation with the accumulated value of the operating time by this aging degradation. Moreover, as for temperature, a change in the temperature of the optical fiber sensor causes fluctuations in the zero point offset amount, and the amount of change in temperature from a predetermined reference temperature has a positive correlation with the magnitude of the zero point offset amount. This is the same for the humidity.

The positive correlation between the amount of state such as the operating time and the temperature (amount of change in temperature from the reference temperature) and the amount of change in the zero point offset amount can be simply stored, for example, in map, and can be also stored in the form of an equation. Further, the amount of change in the zero point offset amount per unit operating time and the amount of change in the zero point offset amount per unit amount of change in temperature can be also stored as a predetermined constant value.

Hence, the map, the equation, or the constant value that are to be stored are stored as data relating to the above-described data, and the present amount of change in the zero point offset amount can be computed, by using the amount of state such as the detected present operating time and temperature, and this relating data.

By substantially subtracting the computed present amount of change in the zero point offset amount from the present amount of output of the optical fiber sensor, the zero point offset amount of the optical fiber sensor can be compensated. Hence, the collision detecting apparatus can reduce fluctuations in the zero point offset amount.

For example, the offset compensating means computes the amount of change in the zero point offset amount of the output of the optical fiber sensor, which is caused by aging degradation, based on previously stored information relating to the characteristics of a change in the zero point offset amount, which are caused by the aging degradation of the optical fiber sensor, and based on computed information relating to the operating time of the optical fiber sensor. In this case, a change in the zero point offset amount of the output of the optical fiber sensor can be reduced by the use of the amount of change in this zero point offset amount.

Alternatively, the offset compensating means computes the amount of change in the zero point offset amount of the output of the optical fiber sensor, which is caused by the present temperature of the optical fiber sensor, based on previously stored information, which relates to the characteristics of a change in the zero point offset amount with respect to the amount of change in temperature from the reference temperature of the optical fiber sensor, and computed information relating to the amount of change in temperature from the reference temperature of the optical fiber sensor. In this case, a change in the zero point offset amount of the output of the optical fiber sensor can be reduced by the use of this amount of change in the zero point offset amount.

Various methods can be considered as a method for compensating the zero point offset amount. For example, the amount of change in the zero point offset amount can be subtracted from the output of the optical fiber sensor. A differential amplifier can be used for this. In addition, it is also recommended that the processing of substantially subtracting only this zero point offset amount is performed by a microcomputer that is arranged in a latter stage which performs digital computing processing relating to the collision load by the use of the output of the optical fiber sensor. In addition, when the above-described digital computing processing is substantially the processing of comparing the output of the optical fiber sensor with a threshold value, this threshold value may be changed by only the amount of change in the zero point offset amount. In addition, the amount of change in the zero point offset amount can be compensated also by changing the light emission amount of the optical fiber sensor by only this amount of change in the zero point offset amount.

In addition, the offset compensating means can include: a storage means for storing the amount of change in the zero point offset amount per unit period of the output of the optical fiber sensor; a computation means for computing the amount of state corresponding to the operating time from the time of shipment; a computation means for estimating the present total zero point offset amount on the basis of both of these data; and a subtraction means for subtracting this total zero point offset amount from the present output of the optical fiber sensor.

According to a second aspect of the present invention, a collision detecting apparatus includes: an optical fiber sensor including an optical fiber, which is interposed between a bumper reinforcement and a front bumper of the vehicle and extends in a left-right direction, and a light sending/receiving circuit for introducing light into the optical fiber and for detecting light from the optical fiber; and a collision detecting circuit for extracting information relating to a collision load on the basis of a change in an output signal of the optical fiber sensor, that is caused by deformation of the optical fiber at a time of collision. In addition, the collision detecting circuit stores the output signal of the optical fiber sensor in a period, during which the output signal of the optical fiber sensor is determined to not fluctuate for a predetermined period, as an zero point offset amount of the optical fiber sensor and detects a collision load on the basis of a value obtained by substantially subtracting the zero point offset amount from the output signal of the optical fiber sensor to be inputted thereafter.

The output of the optical fiber sensor outputted in a period during which a change in the output signal of the optical fiber sensor is determined to be zero, for example, just after an engine is started and in a period during which the engine is operated thereafter, is sampled and stored as the zero point offset amount. In this manner, only by subtracting this zero point offset amount from the output of the optical fiber sensor outputted thereafter, an already compensated output signal can be obtained. With this, the offset of zero point of the optical fiber sensor, which is caused by a change in temperature and aging degradation, can be simply corrected by a simple circuit construction. In other words, by taking advantage of the characteristics of collision load that the input of collision load is extremely rare and that a large change in collision load develops when the collision does occur and, when a change in the output signal of the optical fiber sensor is small, the optical fiber sensor is assumed to be at a zero point.

According to a third aspect of the present invention, a collision detecting apparatus includes: an optical fiber sensor including an optical fiber, which is interposed between a bumper reinforcement and a front bumper of the vehicle and extends in a left-right direction, and a light sending/receiving circuit for introducing light into the optical fiber and for detecting light from the optical fiber; and a collision detecting circuit for extracting information relating to a collision load on the basis of a change in an output signal of the optical fiber sensor, that is caused by deformation of the optical fiber at a time of collision. In addition, the collision detecting circuit performs a feedback control of a light emission amount of the optical fiber sensor at intervals in such a way as to converge the output signal of the optical fiber sensor in a period, during which the output signal of the optical fiber sensor is determined to not fluctuate for a predetermined period, on a level of zero, and maintains the light emission amount after the feedback control until the next feedback control. Accordingly, a change in the zero point offset amount of the optical fiber sensor can be compensated and an output signal outputted from the optical fiber sensor not receiving a collision load can be maintained at a middle level within its dynamic range. Therefore, it is not necessary to set the dynamic range of the optical fiber sensor wide.

BRIEF DESCRIPTION OF THE DRAWINGS

Additional objects and advantages of the present invention will be more readily apparent from the following detailed description of preferred embodiments when taken together with the accompanying drawings.

BEST MODES FOR CARRYING OUT THE INVENTION

Hereinafter, embodiments in which this invention is typically used to detect a pedestrian will be described with reference to the drawings. Specifically, a vehicle protecting apparatus using an optical-fiber type collision detecting apparatus for a vehicle of this invention will be described below in the embodiments.

First Embodiment

Figure 1:
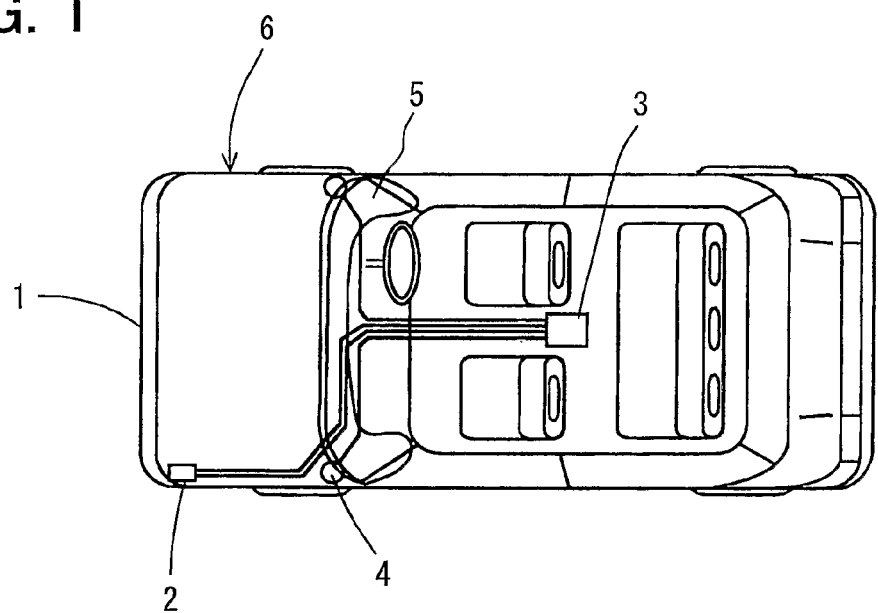
FIG. 1 is a schematic transparent plan view of a vehicle used for embodiments.

The overall structure of this vehicle protecting apparatus is shown by a schematic transparent plan view in FIG. 1. In FIG. 1, reference numeral 1 denotes a front bumper, reference numeral 2 denotes an optical-fiber type pedestrian collision detecting sensor (i.e., an optical-fiber type collision detecting apparatus for a vehicle), reference numeral 3 denotes a pedestrian protecting control device, reference numeral 4 denotes a pillar air bag expanding device, reference numeral 5 denotes a pillar air bag for protecting a pedestrian, and reference numeral 6 denotes a vehicle body. The pedestrian protecting control device 3, the pillar air bag expanding device 4, and the pillar air bag 5 construct an air bag type pedestrian protecting unit for protecting a pedestrian, particularly, the head of a pedestrian who falls down on a bonnet at the time of collision. The pedestrian collision detecting sensor 2 is schematically shown in FIG. 1.

Figure 2:
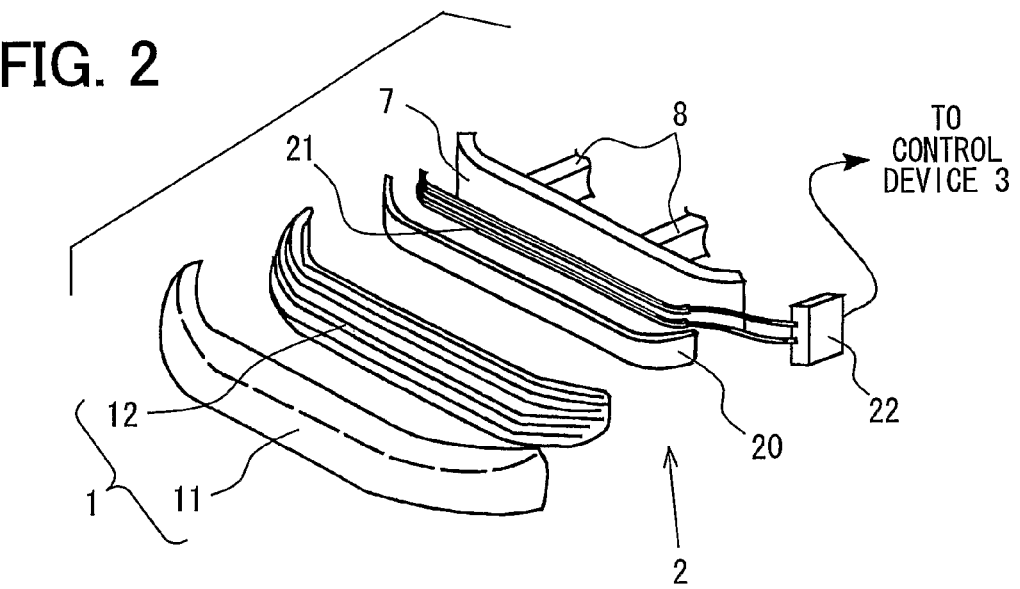
FIG. 2 is a schematic perspective exploded view of a pedestrian collision detecting sensor shown in FIG. 1.
Figure 3:
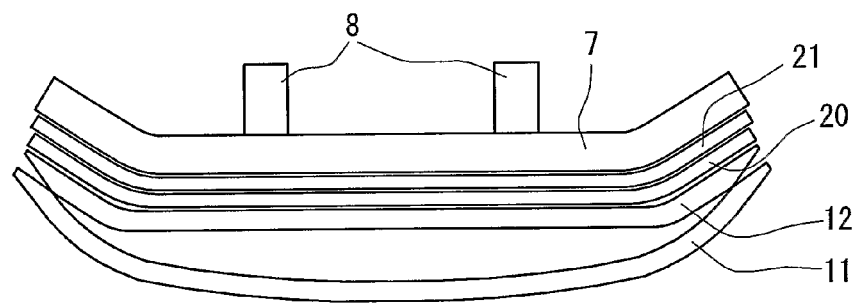
FIG. 3 is a schematic plan view of the pedestrian collision detecting sensor shown in FIG. 2.

The structure of the pedestrian collision detecting sensor 2 will be described with reference to FIG. 2 to FIG. 4. FIG. 2 is a schematic exploded view in perspective of the pedestrian collision detecting sensor 2, and FIG. 3 is a schematic plan view thereof and FIG. 4 is a block diagram thereof.

The pedestrian collision detecting sensor 2 is constructed of a load transmitting plate 20, an optical fiber part 21, and a circuit section 22. The load transmitting plate 20 and the fiber part 21 are interposed between the front bumper 1 and a bumper reinforcement 7 and are extended in the left and right directions along the front end surface of the bumper reinforcement 7. The front bumper 1 is constructed of a bumper cover 11 and a bumper absorber 12 located on the rear side of the bumper cover and is arranged on the front of a vehicle body.

Figure 4:
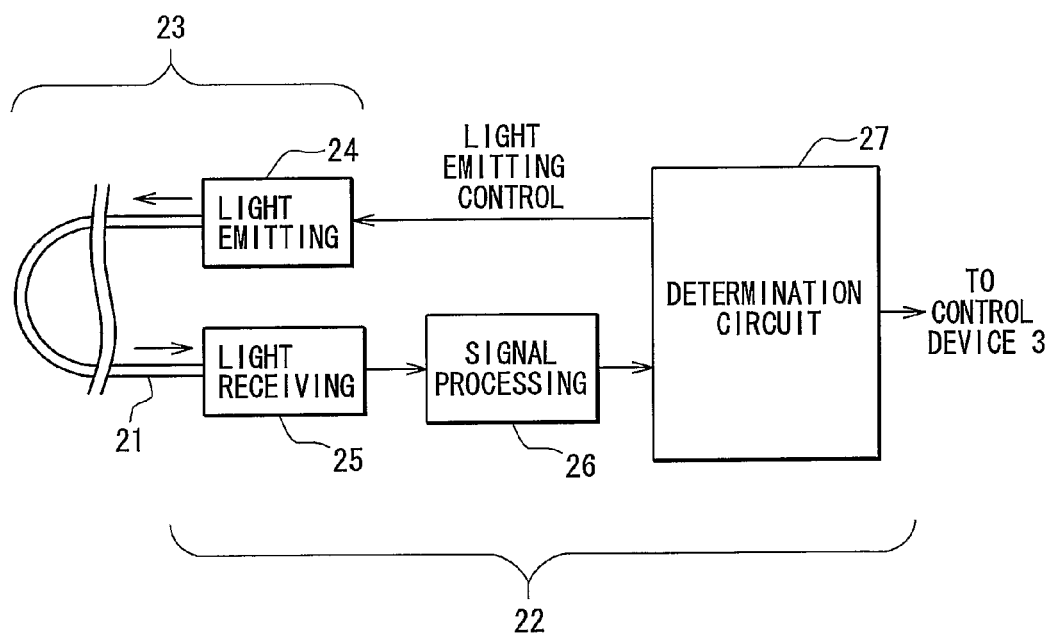
FIG. 4 is a block circuit diagram of the pedestrian collision detecting sensor shown in FIG. 2.

The pedestrian collision detecting sensor 2, as shown in FIG. 4 in terms of circuit, includes, the optical fiber part 21, a light emitting circuit 24, a light receiving circuit 25, a signal processing circuit 26 that amplifies a signal outputted by the light receiving circuit 25 and then converts the signal to a digital signal, and a determination circuit 27 constructed of a microcomputer that determines collision with a pedestrian by processing the digital signal by a predetermined pedestrian determining routine. When the determination circuit 27 determines a pedestrian collision, the determination circuit 27 sends a notice of the pedestrian collision to the pedestrian protecting control device 3. In addition, on the basis of this notice, the pedestrian protecting control device 3 instructs the pillar air bag expanding device 4 to expand the pillar air bag 5.

The circuit section 22 includes the light emitting circuit 24, the light receiving circuit 25, the signal processing circuit 26 and the determination circuit 27, and is arranged in the left end portion of the front of the vehicle. The optical fiber part 21, the light emitting circuit 24, and the light receiving circuit 25 constructs an optical fiber sensor 23.

The optical fiber part 21 is formed in such a shape of a letter U that is protruded from the circuit section 22 and then is extended along the front end surface of the bumper reinforcement 7 from the left end portion of the bumper reinforcement 7 to the right end portion thereof and then is bent downward 180 degrees and then is extended along the front end surface of the bumper reinforcement 7 from the right end portion of the bumper reinforcement 7 to the left end portion thereof and then is returned to the circuit section 22. The optical fiber part 21 has therein an optical fiber and its structure will be described later. Light introduced from the light emitting circuit 24 to the optical fiber in the optical fiber part 21 is transmitted through the optical fiber and is photoelectrically converted to a detection signal voltage by the light receiving circuit 25.

The signal processing circuit 26 includes a preamplifier that amplifies the detection signal voltage of the light receiving circuit 25 and an A/D converter that converts the output voltage of this preamplifier to a digital signal. The determination circuit 27 determines whether there was a collision with a pedestrian or not on the basis of the converted digital signal.

Figure 5A:
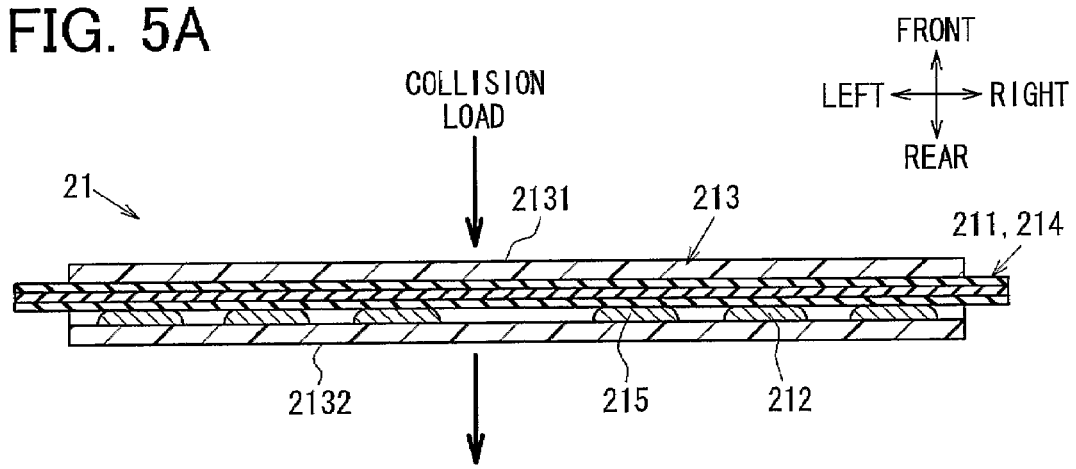
FIG. 5A is a horizontal sectional view showing a fiber part of an optical fiber sensor.
Figure 5B:
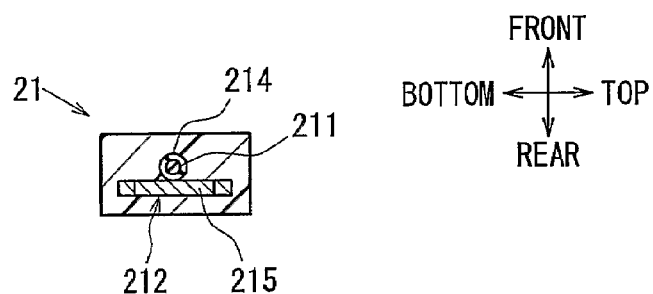
FIG. 5B is a vertical sectional view showing the fiber part of the optical fiber sensor.

The structure of the optical fiber part 21 used in this embodiment will be described with reference to FIGS. 5A and 5B.

The optical fiber part 21 is constructed of an optical fiber 211 extended to the right and left, a stress concentrating plate 212 that is adjacent to the rear side of this optical fiber 211 and is extended vertically and to the right and left, and a silicon resin body 213 in which the optical fiber 211 and the stress concentrating plate 212 are buried and whose vertical section is rectangular. The optical fiber 211 is covered with a covering rubber tube 214.

In the optical fiber part 21, the front surface 2131 of the silicon resin body 213 is in contact with the rear surface of the load transmitting plate 20 and the rear surface 2132 of the silicon resin body 213 is in contact with the front end surface of the bumper reinforcement 7. In place of the above description, the surface 2131 of the silicon resin body 213 may be in contact with the front end surface of the bumper reinforcement 7 and the surface 2132 of the silicon resin body 213 may be in contact with the rear surface of load transmitting plate 20. In addition, it is also recommended that a second stress concentrating plate similar to the stress concentrating plate 20 is fixed on the opposite side of the stress concentrating plate 212 sandwiching the optical fiber 211. In this case, it is preferable that the vertical bridge portions 215 of the stress concentrating plate 212 and the vertical bridge portions of the second stress concentrating plate are shifted in position in the left and right directions. In addition, it is also recommended that the stress concentrating plate 212 is formed from a hard resin.

Figure 6:
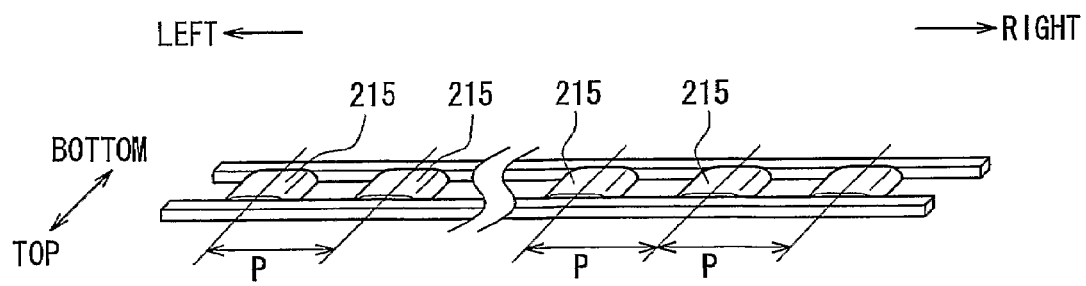
FIG. 6 is a schematic perspective view of a stress concentrating plate.

The stress concentrating plate 212 will be described with reference to the schematic perspective view in FIG. 6. The stress concentrating plate 212 is formed in the shape of a ladder by punching out a thin long metal plate and has many vertical bridge portions 215 (also referred to as "mountain portions") formed at predetermined pitches in the left and right directions of the vehicle. The respective vertical bridge portions 215 are put into contact with the outer peripheral surface of the rubber tube 214 for covering the optical fiber 211 and are extended in the vertical direction.

Figure 7:
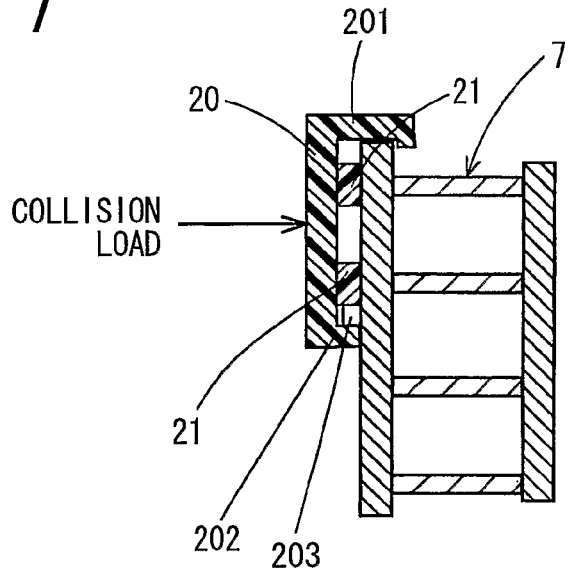
FIG. 7 is a longitudinal sectional view of a load transmitting plate.

The configuration of the load transmission plate 20 used in this embodiment will be described with reference to FIG. 7. FIG. 7 is a longitudinal sectional view showing the load transmitting plate 20. The load transmission plate 20 is formed of resin and, as shown in FIG. 7, is interposed between the bumper absorber 12 and the optical fiber part 21. Furthermore, the load transmission plate 20 is extended in the vertical direction and in the left and right directions of the vehicle. The optical part 21 is sandwiched between the rear surface of the load transmitting plate 20 and the front end surface of the bumper reinforcement 7 and is extended to the left and right in contact with the upper half portion of the front end surface of the bumper reinforcement 7. In this embodiment, the load transmitting plate 20 is formed from a resin plate and has rigidity higher than the bumper cover 11 and extends in the vertical direction and in the left and right directions. An overhanging portion 201 is overhung from the top end of the load transmitting plate 20 to the rear, and a protruding portion 202 is protruded from the bottom end of the load transmitting plate 20 to the rear. The rear end of the overhanging portion 201 has a stopper portion bent downward. A protruding portion 203 is protruded from the front end surface of the bumper reinforcement 7 at a position below a pair of fiber portions 21 and above the protruding portion 202. The bottom surface of the overhanging portion 201 abuts against the top surface of the bumper reinforcement 7. With this construction, the load transmitting plate 20 is prevented from being displaced upward because the protruding portion 203 prevents the protruding portion 202 from being displaced upward. Similarly, the load transmitting plate 20 is prevented from being displaced rearward because the top surface of the bumper reinforcement 7 prevents the overhanging portion 201 from being displaced downward. With this, the load transmitting plate 20 is prevented from being displaced in the vertical direction due to vertical vibration and the like of the vehicle body.

The overhanging portion 201 can be moved back and forth in sliding contact with the top surface of the bumper reinforcement 7 and hence the load transmitting plate 20 can transmit collision load to the optical fiber portion 21 without trouble. In this case, when the length protruding rearward of the protruding portion 202 is short, the load transmitting plate 20 can be moved straight rearward. When the length protruding rearward of the protruding portion 202 is long and the tip of the protruding portion 202 abuts against the front end surface of the bumper reinforcement 7, the load transmitting plate 20 is turned clockwise with the protruding portion 202 at the center of turning. In any of these cases, by increasing the rigidity of the load transmitting plate 20 and decreasing the amount of deformation caused by the collision load, it is possible to prevent the optical fiber portion 21 from being locally deformed and to apply the collision load to a wide region of the optical fiber portion 21.

The operation of the above-described pedestrian collision detecting sensor 2 will be described below. When a collision load is applied to the optical fiber portion 21 in the back-forth direction, because the silicon resin body 213 and the rubber tube 214 are easily elastically deformed, the collision load is locally applied to the optical fiber 211 at the vertical bridge portions (also referred to as "mountain portions") 215 of the stress concentrating plate 212. For this reason, the optical fiber 211 is bent at these portions in positive correlation with the collision load and the amount of light transmitted by the optical fiber 211 decreases in accordance with the amount of bending. Hence, when a predetermined amount of light enters one end of the optical fiber 211 from the light emitting circuit 24, the amount of light entering the light receiving circuit 25 from the other end of the optical fiber 211 is a value correlating with the collision load and hence the output signal of the light receiving circuit 25 varies in connection with the collision load.

The output signal of the light receiving circuit 25 is amplified by a signal processing circuit 26 and then is converted to a digital signal and is compared with a threshold by the determination circuit 27, so that pedestrian determination is performed by the comparison result. When it is determined that the vehicle collides with a pedestrian, the pedestrian protecting control device 3 instructs the pillar air bag expanding device 4 to expand the pillar air bag 5. The pedestrian determination by the collision load can be also performed by the use of a map meaning multiple thresholds. The determination circuit 27 may be constructed of a hardware circuit such as a comparator.

Compensation for zero point of the first embodiment will be described below with reference to a flow diagram shown in FIG. 8. This flow diagram is executed at predetermined intervals by the determination circuit 27 including a microcomputer. However, it is assumed that the output level of the optical fiber sensor 23 is adjusted to a level of zero at a predetermined reference temperature at the time of shipment. The determination circuit 27 stores an aging degradation coefficient, which is the amount of change in the zero point offset amount per unit period at the time of shipment and a temperature coefficient which is the amount of change in the zero point offset amount per predetermined unit temperature change in a non-volatile manner in a built-in non-volatile memory. These coefficients may be individually input by testing the optical fibers individually and an average value found by testing the optical fibers previously may be input in a collective manner.

Figure 8:
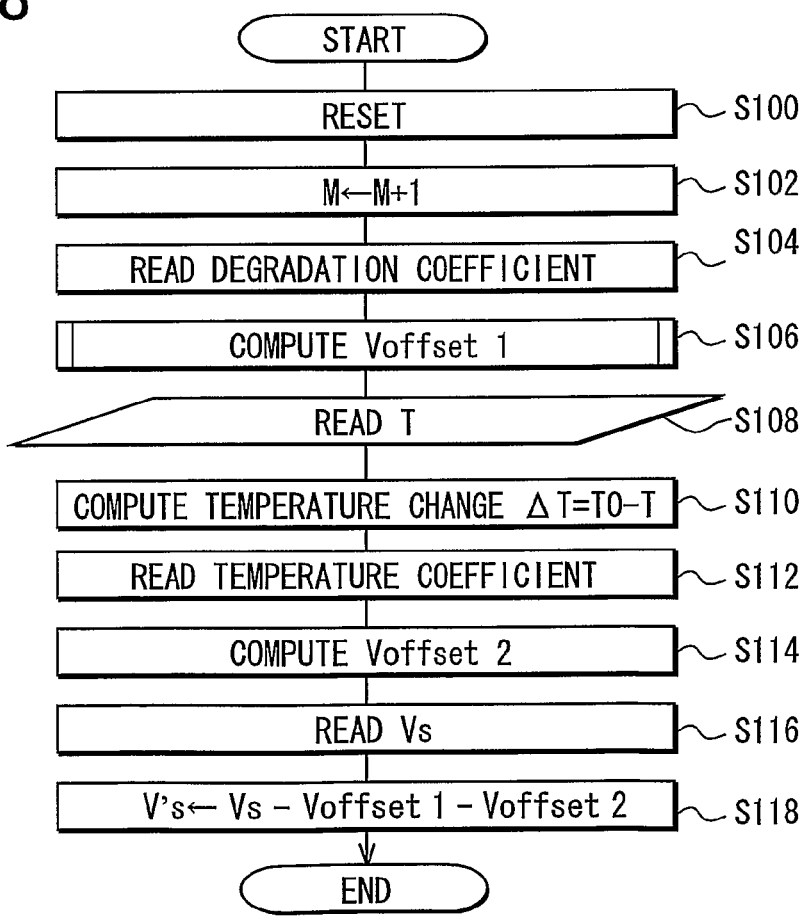
FIG. 8 is a flow diagram showing a method for compensating offset according to a first embodiment.

First, when an ignition key switch is turned on, the routine shown in FIG. 8 is started, whereby circuits needed to be reset are reset (S100) and then the optical fiber sensor is supplied with power. Next, the number of power supplies M, which is the number of power supplies to the optical fiber sensor after the shipment, is incremented (S102). The number of power supplies M is stored in an EEPROM and hence is updated after the shipment, but it is not destroyed when the power supply is off.

Next, the value of the previously stored degradation coefficient is read from the EEPROM (S104) and the read value of the degradation coefficient is multiplied by the number of power supplies M to compute the amount of change Voffset1 of the zero point offset amount of the optical fiber sensor from the time of shipment (S106). This degradation coefficient is the amount of change in the zero point offset amount of the optical fiber sensor per one power supply.

In this embodiment, a present temperature T is read from a temperature detecting means constructed of a thermistor type temperature sensor located in the circuit section 22 (S108), and a temperature difference ΔT between the reference temperature T0 and the temperature T is computed (S110). Next, the previously stored value of temperature coefficient is read from the EEPROM (S112) and the read value of temperature coefficient is multiplied by the temperature difference ΔT to compute the amount of change Voffset2 in the zero point offset amount of the optical fiber sensor from the reference temperature (S114). This temperature coefficient is the amount of change in the zero point offset amount of the optical fiber sensor per unit amount of change in temperature.

Next, a present output Vs is read from the optical fiber sensor (S116) and the amounts of change Voffset1 and Voffset2 in the zero point offset amount are subtracted from the output Vs to calculate an output Vs' that is compensated for a change in the zero point offset amount (S118). Because this output Vs' is compensated for the zero point offset amount of the output, by computing a collision load by the use of this output Vs' or by assuming this output Vs' as a value to represent a collision load and comparing the output Vs' with a predetermined threshold, it is determined whether or not the collision load is caused by a pedestrian.

According to this embodiment, a change in the zero point offset amount of the optical fiber sensor caused by the temperature change and the aging degradation can be effectively compensated. Therefore, it is possible to improve the accuracy of determination of the pedestrian, for example, by the collision load.

According to this embodiment, an optical-fiber type collision detecting apparatus includes: the optical fiber sensor 23 including the optical fiber 21, which is interposed between the bumper reinforcement 7 and the front bumper 1 of the vehicle and extends in the left-right direction, and a light sending/receiving circuit 24, 25 for introducing light into the optical fiber 21 and for detecting light from the optical fiber 21; and a collision detecting circuit (27) for extracting information relating to a collision load on the basis of a change in an output signal of the optical fiber sensor 23, that is caused by deformation of the optical fiber 21 at a time of collision. The optical-fiber type collision detecting apparatus further includes: a detection means for detecting an amount of state that is correlated with fluctuations in a previously stored zero point offset amount of output of the optical fiber sensor 23 and is capable of being converted to a state of an electric signal; a storage means for storing relating data showing relation between the amount of state and the zero point offset amount; and an offset compensating means for compensating fluctuations in the zero point offset amount on the basis of the amount of state detected by the detection means and the relating data stored by the storage means.

The amount of state is correlated with fluctuations in the zero point offset amount and can be converted to a state of an electric signal. For example, the amount of state is an operating time of the optical fiber sensor 23, a temperature and a humidity of the optical fiber sensor 23, the histories of them, and a combination of them. The operating time causes the aging degradation of the optical fiber sensor 23 and the magnitude of the zero point offset amount has a positive correlation with the accumulated value of the operating time by this aging degradation. Moreover, as for temperature, a change in the temperature of the optical fiber sensor causes fluctuations in the zero point offset amount and the amount of change in temperature from a predetermined reference temperature has a positive correlation with the magnitude of the zero point offset amount. This is the same for the humidity.

The positive correlation between the amount of state such as the operating time and the temperature (amount of change in temperature from the reference temperature) and the amount of change in the zero point offset amount can be stored in map, for example, more simply, can be also stored in the form of an equation. Further, the amount of change in the zero point offset amount per unit operating time and the amount of change in the zero point offset amount per unit amount of change in temperature can be also stored as a predetermined constant value.

Hence, the map, the equation, or the constant value that are to be stored are stored as data relating to the above-described data, and the present amount of change in the zero point-offset amount can be computed from the amount of state such as the detected present operating time and temperature and this relating data.

By substantially subtracting the computed present amount of change in the zero point offset amount from the present amount of output of the optical fiber sensor, the zero point offset amount of the optical fiber sensor can be compensated.

For example, the offset compensating means computes the amount of change in the zero point offset amount of the output of the optical fiber sensor, which is caused by aging degradation, from previously stored information relating to the characteristics of a change in the zero point offset amount, which are caused by the aging degradation of the optical fiber sensor, and from computed information relating to the operating time of the optical fiber sensor, and a change in the zero point offset amount of the output of the optical fiber sensor can be reduced by the use of the amount of change in this zero point offset amount.

Alternatively, the offset compensating means computes the amount of change in the zero point offset amount of the output of the optical fiber sensor, which is caused by the present temperature of the optical fiber sensor, can be computed from previously stored information, which relates to the characteristics of a change in the zero point offset amount with respect to the amount of change in temperature from the reference temperature of the optical fiber sensor, and from computed information relating to the amount of change in temperature from the reference temperature of the optical fiber sensor, and a change in the zero point offset amount of the output of the optical fiber sensor can be reduced by the use of this amount of change in the zero point offset amount.

Various methods can be considered as a method for compensating the zero point offset amount.

For example, the amount of change in the zero point offset amount is subtracted from the output of the optical fiber sensor. A differential amplifier can be used for this. In addition, the processing of substantially subtracting only this zero point offset amount may be performed by a microcomputer that is arranged in a latter stage which performs digital computing processing relating to the collision load by the use of the output of the optical fiber sensor. In addition, when the above-described digital computing processing is substantially the processing of comparing the output of the optical fiber sensor with a threshold value, this threshold value may be changed by only the amount of change Voffset in the zero point offset amount. In addition, the amount of change Voffset in the zero point offset amount can be compensated also by changing the light emission amount of the optical fiber sensor by only this amount of change Voffset in the zero point offset amount.

For example, the offset compensating means can include: a storage means for storing the amount of change in the zero point offset amount per unit period of the output of the optical fiber sensor; a computation means for computing the amount of state corresponding to the operating time from the time of shipment; a computation means for estimating the present total zero point offset amount on the basis of both of these data; and a subtraction means for subtracting this total zero point offset amount from the present output of the optical fiber sensor.

Second Embodiment

A method for compensating a change in the zero point offset amount in the second embodiment will be described below with reference to flow diagrams shown in FIGS. 9 and 10. These flow diagrams are executed by the determination circuit 27.

Figure 9:
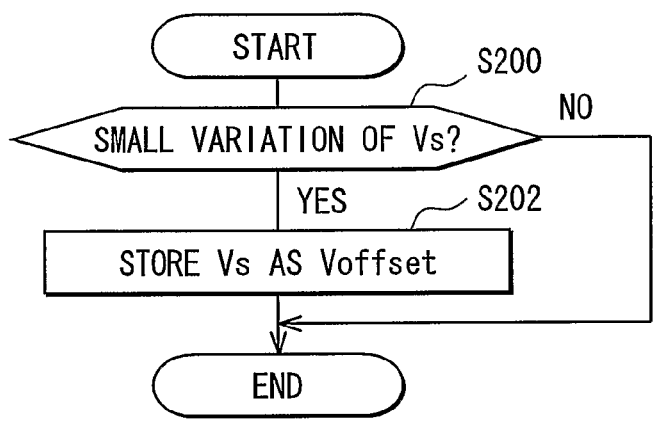
FIG. 9 is a flow diagram showing a routine for detecting the amount of offset in a second embodiment.

In FIG. 9, first, it is determined whether or not a change in an input signal voltage Vs from the optical fiber part 21 for an immediately previous predetermined time is within a predetermined small range (S200). When the determined result is NO, the routine is finished. In contrast, when the detected result is YES, it is determined that collision has not occurred at the present time and the input signal voltage Vs at this time is stored as an offset voltage Voffset (S202) and then this routine for detecting an offset voltage Voffset is finished. This routine is to be executed at predetermined intervals.

Figure 10:
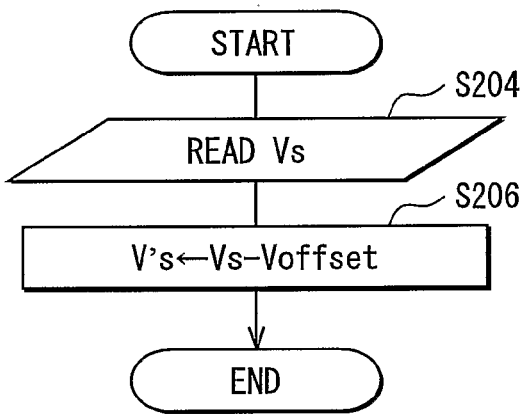
FIG. 10 is a flow diagram showing a routine for compensating offset in the second embodiment.

In FIG. 10, first, the input signal voltage Vs from the optical fiber part 21 is read (S204) and the stored offset voltage Voffset is subtracted from the read input signal voltage Vs to make an input signal voltage Vs' compensated for offset (S206). The input signal voltage Vs' compensated for offset is thereafter compared with a threshold voltage for determining a pedestrian, thereby being used for pedestrian determination and collision determination.

In this manner, it is possible to compensate fluctuations in the offset voltage Voffset, which are caused by the temperature change and the aging degradation of the optical fiber sensor, by a simple circuit construction.

In the above-described second embodiment, a change in the offset voltage Voffset is cancelled by subtraction processing in the microcomputer. However, in place of this, it is also recommended that the calculated offset voltage Voffset is introduced to one input terminal of the differential amplifier of the signal processing circuit 26 which amplifies the output voltage of the optical fiber sensor, or the differential amplifier of the light receiving circuit 25 of the optical fiber sensor, and is subjected to subtraction processing by these signal processing circuit 26 or the light receiving circuit 25 and then is converted to a digital signal.

According to the second embodiment of the present invention, a collision detecting apparatus includes the collision detecting circuit (27) that stores the output signal of the optical fiber sensor 23 in a period, during which the output signal of the optical fiber sensor 23 is determined to not fluctuate for a predetermined period, as an zero point offset amount of the optical fiber sensor 23 and detects a collision load on the basis of a value obtained by substantially subtracting the zero point offset amount from the output signal of the optical fiber sensor 23 to be inputted thereafter.

That is, the output of the optical fiber sensor 23 outputted in a period during which a change in the output signal of the optical fiber sensor 23 is determined to be zero, for example, just after an engine is started and in a period during which the engine is operated thereafter, is sampled and stored as the zero point offset amount. In this manner, only by subtracting this zero point offset amount from the output of the optical fiber sensor 23 outputted thereafter, an already compensated output signal can be obtained. With this, the offset of zero point of the optical fiber sensor 23, which is caused by a change in temperature and aging degradation, can be simply corrected by a simple circuit construction. In other words, by taking advantage of the characteristics of collision load that the input of collision load is extremely rare and that a large change in collision load develops when the collision does occur and when a change in the output signal of the optical fiber sensor 23 is small, the optical fiber sensor 23 is assumed to be at a zero point.

In addition, the above-described described control process of the second embodiment may be combined with the control process of the above-described first embodiment.

Third Embodiment

Figure 11:
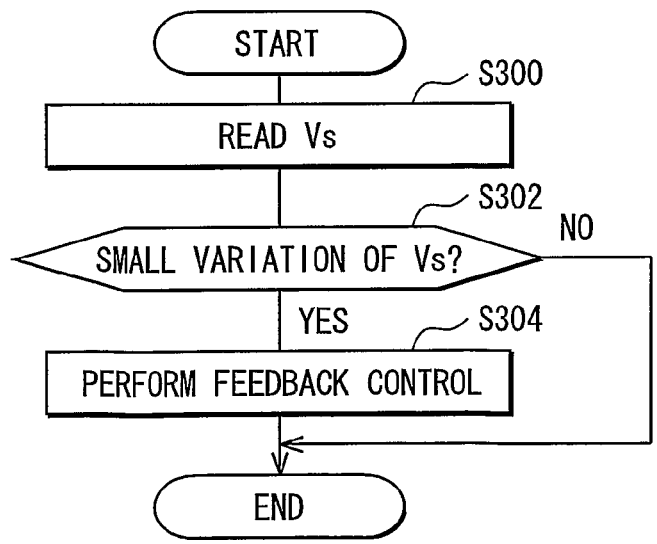
FIG. 11 is a flow diagram showing a routine for compensating offset in a third embodiment.

A method for compensating a change in the zero point offset amount in the third embodiment will be described with reference to a flow diagram shown in FIG. 11. This flow diagram is executed by the determination circuit 27.

First, the input signal voltage Vs is read from the optical fiber part 21 (S300). Then, it is determined whether or not fluctuations in the input signal voltage Vs in an immediately previous predetermined period are substantially zero (S302). When there are fluctuations, this routine is finished. When there are not fluctuations, the light emission amount of the optical fiber sensor is controlled to feedback in such a way that the output of the optical fiber sensor at this time converges on a level of zero (a predetermined value within the dynamic range of the output of the optical fiber sensor) and the light emission amount at this time is fixed (S304). With this, the output of the optical fiber sensor is fixed to a predetermined value within the dynamic range of the output in which the zero point offset amount is zero. In this manner, when a collision load develops thereafter, even if the dynamic range of the optical fiber sensor is not wide, it is possible to secure a dynamic range of a necessary output signal.

According to the third embodiment, in an optical-fiber type collision detecting apparatus, the collision detecting circuit (27) performs a feedback control of a light emission amount of the optical fiber sensor at intervals in such a way as to converge the output signal of the optical fiber sensor in a period, during which the output signal of the optical fiber sensor 23 is determined to not fluctuate for a predetermined period, on a level of zero, and maintains the light emission amount after the feedback control until the next feedback control. Accordingly, a change in the zero point offset amount of the optical fiber sensor can be compensated and an output signal outputted from the optical fiber sensor 23 not receiving a collision load can be maintained at a middle level within its dynamic range. Therefore, it is not necessary to set the dynamic range of the optical fiber sensor wide.

Other Embodiments

Although the present invention has been fully described in connection with the preferred embodiments thereof with reference to the accompanying drawings, it is to be noted that various changes and modifications will become apparent to those skilled in the art.

For example, in the above-described embodiments, the present invention is typically applied to the vehicle protecting apparatus using the optical-fiber type collision detecting apparatus for a vehicle. However, the present invention is not limited to the embodiments described above, and can include a combination of generally known constituent elements.

Such changes and modifications are to be understood as being within the scope of the present invention as defined by the appended claims.

The invention claimed is:

1. A collision detecting apparatus for a vehicle, comprising:
   an optical fiber sensor including an optical fiber, which is interposed between a bumper reinforcement and a front bumper of the vehicle and extends in a left-right direction, and a light sending/receiving circuit for introducing light into the optical fiber and for detecting light from the optical fiber;
   a collision detecting circuit for extracting information relating to a collision load on the basis of a change in an output signal of the optical fiber sensor, that is caused by deformation of the optical fiber at a time of collision;
   a detection means for detecting an amount of state that is correlated with fluctuations in a previously stored zero point offset amount of output of the optical fiber sensor and is capable of being converted to a state of an electric signal;
   a storage means for storing relating data showing relation between the amount of state and the zero point offset amount; and
   an offset compensating means for compensating fluctuations in the zero point offset amount on the basis of the amount of state detected by the detection means and the relating data stored by the storage means.

2. The collision detecting apparatus according to claim 1, wherein:
   the offset compensating means computes an amount of change in the zero point offset amount of the output of the optical fiber sensor, based on a previously stored information relating to a change in the zero point offset amount and computed information relating to an operating time of the optical fiber sensor; and
   the offset compensating means reduces a change in the zero point offset amount by using the calculated amount of change in this zero point offset amount.

3. The collision detecting apparatus according to claim 1, wherein:
   the offset compensating means computes an amount of change in the zero point offset amount of the output of the optical fiber sensor, based on the previously stored information, which relates to a change in the zero point offset amount with respect to an amount of change in temperature from a reference temperature of the optical fiber sensor, and computed information relating to the amount of change in temperature from a reference temperature of the optical fiber sensor; and
   the offset compensating means reduces a change in the zero point offset amount of the output of the optical fiber sensor by using the amount of change in the zero point offset amount.

4. The collision detecting apparatus according to claim 1, wherein:
   the amount of state detected by the detection means is at least one of an operating time of the optical fiber sensor, and a temperature and a humidity in operating state of the optical fiber sensor.

5. An optical-fiber type collision detecting apparatus for a vehicle, comprising:
   an optical fiber sensor including an optical fiber, which is interposed between a bumper reinforcement and a front bumper of the vehicle and extends in a left-right direction, and a light sending/receiving circuit for introducing light into the optical fiber and for detecting light from the optical fiber; and
   a collision detecting circuit for extracting information relating to a collision load on the basis of a change in an output signal of the optical fiber sensor, that is caused by deformation of the optical fiber at a time of collision,
   wherein the collision detecting circuit stores the output signal of the optical fiber sensor in a period, during which the output signal of the optical fiber sensor is determined to not fluctuate for a predetermined period, as a zero point offset amount of the optical fiber sensor and detects a collision load on the basis of a value obtained by substantially subtracting the zero point offset amount from the output signal of the optical fiber sensor to be inputted thereafter.

6. An optical-fiber type collision detecting apparatus for a vehicle, comprising:

an optical fiber sensor including an optical fiber, which is interposed between a bumper reinforcement and a front bumper of the vehicle and extends in a left-right direction, and a light sending/receiving circuit for introducing light into the optical fiber and detecting light from the optical fiber; and a collision detecting circuit for extracting information relating to a collision load on the basis of a change in an output signal of the optical fiber sensor, that is caused by deformation of the optical fiber at a time of collision, wherein the collision detecting circuit performs a feedback control of a light emission amount of the optical fiber sensor at intervals in such a way as to converge the output signal of the optical fiber sensor in a period, during which the output signal of the optical fiber sensor is determined to not fluctuate for a predetermined period, on a level of zero, and maintains the light emission amount after the feedback control until the next feedback control.

* * * * *